United States Patent
Omori (10) Patent No.: US 10,545,680 B2
(45) Date of Patent: Jan. 28, 2020

(54) RECORDING/REPRODUCTION APPARATUS, CONTROL METHOD OF RECORDING/REPRODUCTION APPARATUS, AND NON-TRANSITORY COMPUTER-READABLE STORAGE MEDIUM

(71) Applicant: CANON KABUSHIKI KAISHA, Tokyo (JP)

(72) Inventor: Noboru Omori, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/928,879

(22) Filed: Mar. 22, 2018

(65) Prior Publication Data

US 2018/0284998 A1    Oct. 4, 2018

(30) Foreign Application Priority Data

Mar. 30, 2017  (JP) .................................. 2017-068745

(51) Int. Cl.
    *G06F 13/00*    (2006.01)
    *G06F 3/06*     (2006.01)
    *G06F 12/084*   (2016.01)

(52) U.S. Cl.
    CPC .......... *G06F 3/0617* (2013.01); *G06F 3/0634* (2013.01); *G06F 3/0656* (2013.01); *G06F 3/0659* (2013.01); *G06F 3/0688* (2013.01); *G06F 12/084* (2013.01); *G06F 2212/1008* (2013.01); *G06F 2212/2022* (2013.01)

(58) Field of Classification Search
CPC ............... G06F 13/1389; G06F 3/0659; G06F 2213/3804; G11C 7/22; G11C 7/1072
See application file for complete search history.

(56) References Cited

U.S. PATENT DOCUMENTS

| | | | |
|---|---|---|---|
| 6,556,505 B1 * | 4/2003 | Tojima | G06F 1/10 365/194 |
| 9,288,429 B2 | 3/2016 | Omori | |
| 2003/0002316 A1 * | 1/2003 | Morita | G11C 7/1045 365/63 |

(Continued)

FOREIGN PATENT DOCUMENTS

JP    2012-054715 A    3/2012

*Primary Examiner* — Sean D Rossiter
(74) *Attorney, Agent, or Firm* — Carter, DeLuca & Farrell LLP (57) ABSTRACT

A recording/reproduction apparatus comprising an output unit outputs a clock signal to each of a plurality of recording media, a communication unit transmits a write command and write data to each of the plurality of recording media to write the data in the recording medium and receives a response to the write command, that is transmitted from each of the plurality of recording media, in accordance with a timing signal obtained by delaying the clock signal, and a control unit controls the communication unit to execute relay recording of, if data is transmitted and written in a first recording medium of the plurality of recording media, continuing the write of the data by switching a transmission destination of the data from the first recording medium to a second recording medium of the plurality of recording media.

14 Claims, 8 Drawing Sheets

(56) References Cited

U.S. PATENT DOCUMENTS

| | | | |
|---|---|---|---|
| 2007/0152723 A1* | 7/2007 | Ahn | G11C 7/22 |
| | | | 327/158 |
| 2009/0154256 A1* | 6/2009 | Kim | G11C 7/1051 |
| | | | 365/189.05 |
| 2016/0182063 A1* | 6/2016 | Seo | H03L 7/0812 |
| | | | 327/149 |
| 2016/0284385 A1* | 9/2016 | Nomura | G06F 1/3284 |
| 2018/0276152 A1* | 9/2018 | Omori | G06F 3/0631 |
| 2018/0278257 A1* | 9/2018 | Omori | G11B 20/10527 |

* cited by examiner

RECORDING/REPRODUCTION APPARATUS, CONTROL METHOD OF RECORDING/REPRODUCTION APPARATUS, AND NON-TRANSITORY COMPUTER-READABLE STORAGE MEDIUM

BACKGROUND OF THE INVENTION

Field of the Invention

The invention relates to a recording/reproduction apparatus, a control method of the recording/reproduction apparatus, and a non-transitory computer-readable storage medium.

Description of the Related Art

There is provided an apparatus that writes image data, audio data, and the like in a recording medium such as a memory card, or reads data recorded in a recording medium and reproduces it. An operation of writing or reading data between a recording medium and an apparatus (host apparatus) to which the recording medium is connected is performed in response to a clock signal generated by the host apparatus. After the host apparatus transmits one clock pulse of a clock signal, data to be written or read is transmitted/received or a response to a command is received. Thus, the clock pulse and the data or response are not always transmitted/received at a completely synchronized timing. If, for example, the host apparatus reads data from a recording medium such as an SD memory card, there is a delay of a standardized fixed value from when the host apparatus transmits a clock pulse to the recording medium until data is transmitted. Therefore, the host apparatus latches the data transmitted from the recording medium at a timing delayed by the fixed value from the transmission of the clock pulse, thereby acquiring the data transmitted from the recording medium.

On the other hand, in recent years, it is necessary to increase the speed of transmission of a clock pulse along with improvement in data rate at which data is read/written from/in a recording medium, and it is difficult to define, by a fixed value, a delay amount from the clock pulse for data acquisition. To cope with this, UHS-I (Ultra High Speed) as the high-speed standard of the SD memory card defines that when reading data using a high-speed clock, data is read after adjusting a data latch timing for each card. This latch timing adjustment operation is called tuning processing (see Japanese Patent Laid-Open No. 2012-54715).

Furthermore, there is proposed an apparatus having a function of, if the free capacity of a recording medium as a recording destination runs out, continuing recording of a moving image by changing a recording destination to another recording medium. The function of continuing recording of a moving image by switching the recording destination is called "relay recording". In relay recording, it is necessary to perform relay processing of writing management information to close a file being recorded in a recording medium as a relay source and writing management information to newly open a file in a recording medium as a relay destination. During this processing, the data writing speed in the recording medium decreases. Thus, the free capacity of a buffer may temporarily decrease during the relay processing.

As described above, during the relay processing, the free capacity of the buffer memory to store moving image data becomes small. To cope with this, it is desirable to avoid an error of write data or a retry from occurring due to deviation of the timing of receiving a response from a card.

Furthermore, during the tuning processing, it is impossible to write or read data. Therefore, if the tuning processing is performed during the relay processing, the free capacity of the buffer memory to store moving image data further decreases, and the buffer memory may overflow, thereby stopping recording.

SUMMARY OF THE INVENTION

The invention provides a technique of suppressing occurrence of a recording stop caused by a buffer overflow while suppressing occurrence of a write error or retry caused by a lack of tuning during relay processing.

One aspect of embodiments of the invention relates to a recording/reproduction apparatus comprising an output unit configured to output a clock signal to each of a plurality of recording media, a communication unit configured to transmit a write command and write data to each of the plurality of recording media to write the data in the recording medium and to receive a response to the write command, that is transmitted from each of the plurality of recording media, in accordance with a timing signal obtained by delaying the clock signal, and a control unit configured to control the communication unit to execute relay recording of, if data is transmitted and written in a first recording medium of the plurality of recording media, continuing the write of the data by switching a transmission destination of the data from the first recording medium to a second recording medium of the plurality of recording media, wherein the control unit controls the communication unit so as to execute adjustment processing of adjusting a delay amount of the timing signal with respect to the second recording medium before switching the transmission destination of the data from the first recording medium to the second recording medium, and causes the communication unit to write, in the first recording medium, data of a data amount based on a time taken for the adjustment processing before executing the relay recording after the adjustment processing.

Further features of the invention will become apparent from the following description of exemplary embodiments (with reference to the attached drawings).

DESCRIPTION OF THE EMBODIMENTS

Embodiments of the invention will be described below with reference to the accompanying drawings. Note that the technical scope of the invention is determined by the scope of claims and is not limited by the following individual embodiments. In addition, not all the combinations of features described in the embodiments are necessarily essential to the invention.

First Embodiment

An exemplary embodiment of the invention will be described in detail below with reference to the accompanying drawings. Note that in the embodiment to be described below, an example in which the invention is applied to a digital camera capable of writing/reading data in/from a connected memory card and executing relay recording will be described as an example of a recording/reproduction apparatus. The invention, however, is applicable to an arbitrary apparatus (host apparatus) capable of writing/reading data in/from a recording medium and executing relay recording. The invention is not limited to the digital camera, and can be implemented by, for example, an arbitrary host apparatus such as a personal computer, a mobile phone, a smartphone, a PDA, a digital video camera, a tablet terminal, or a portable media player, an information processing apparatus, an image capturing apparatus, a data generation apparatus, or the like.

Figure 1:
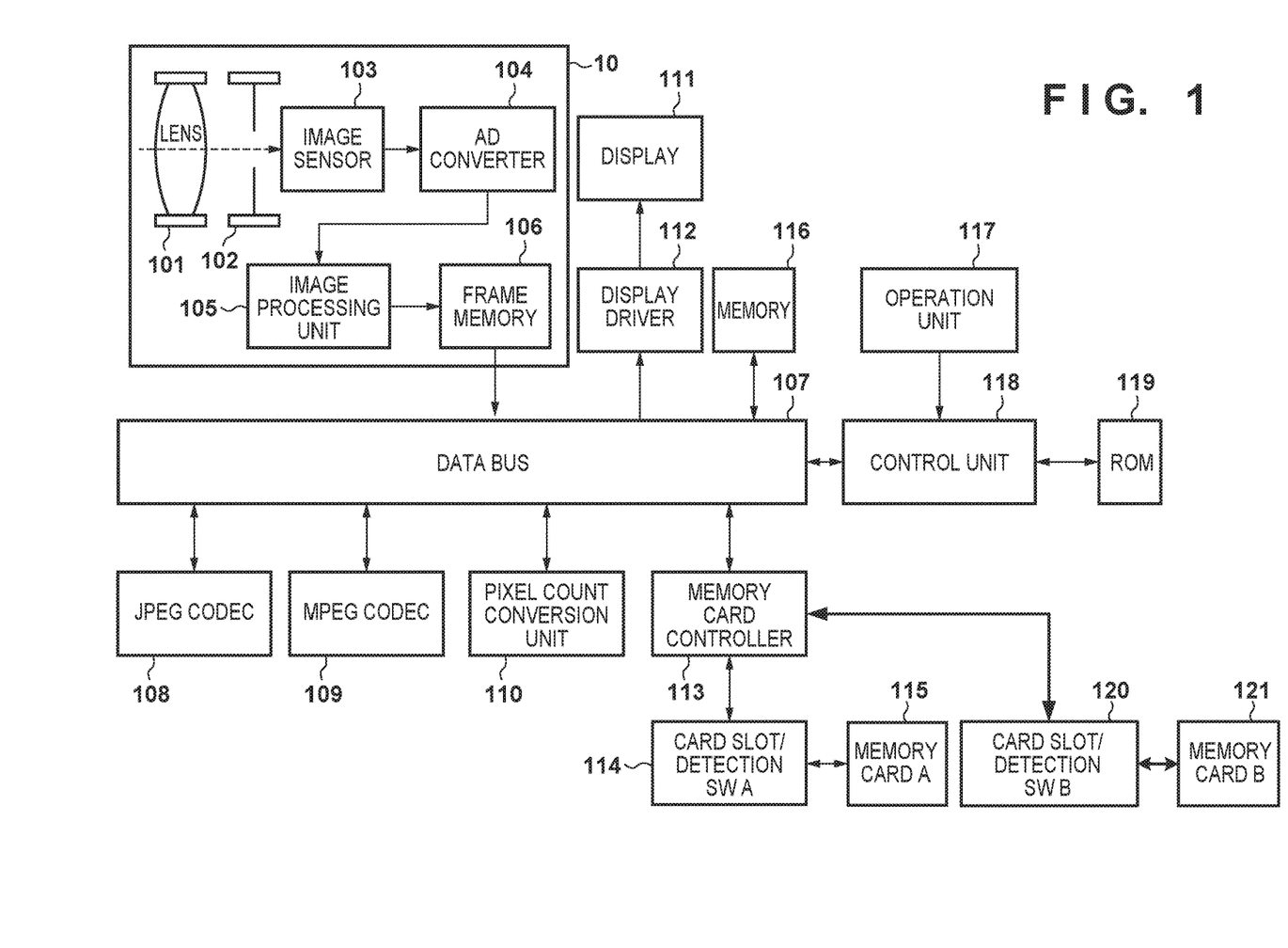
FIG. 1 is a block diagram showing an example of the arrangement of a recording/reproduction apparatus according to an embodiment of the invention.

FIG. 1 is a block diagram showing an example of the arrangement of a digital camera 100 according to this embodiment. Referring to FIG. 1, a photographing lens 101 captures an object image and forms the object image on an image sensor 103 after restricting a light amount to a predetermined amount by a stop 102. An A/D converter 104 digitizes the formed object image. The digitized image data undergoes gamma correction, white balance correction, and noise reduction processing in an image processing unit 105, and is then held in a frame memory 106. The image data held in the frame memory 106 is output to a data bus 107 as uncompressed image data.

In this embodiment, an arrangement including the components from the photographing lens 101 to the frame memory 106 will be referred to as an image capturing unit 10 hereinafter. In the following embodiment, a case in which image data output from the image capturing unit 10 is written in a memory card A 115 or memory card B 121 as a recording medium will be described. However, a target to which the invention is applicable is not limited to image data, and the invention is applicable to audio data, multimedia data including moving image data and audio data, or another arbitrary data that can be written in the memory card. These kinds of data can collectively be referred to as information data. A recording/reproduction apparatus according to the embodiment of the invention can further include, in order to generate the information data, an audio generation unit including a microphone, an A/D converter, and an audio processing unit in addition to the image capturing unit 10. The image capturing unit 10 outputs uncompressed image data and image display data to the data bus 107, and the data are stored in a memory 116. The memory 116 may be implemented by, for example, a DRAM. A JPEG codec 108 compression-codes the uncompressed image data as a still image, thereby generating JPEG still image data. An MPEG codec 109 compression-codes the uncompressed image data as a moving image, thereby generating an MPEG moving image data.

A display 111 is a display unit that displays an image and various kinds of information, and is formed by, for example, a liquid crystal panel. A display driver 112 converts image display data stored (held) in the memory 116 into a display signal for the display 111 and supplies it to the display 111. The display image data written in the memory 116 is displayed on the display 111 via the display driver 112. The display 111 can function as an electronic viewfinder to perform through image display. If the display 111 is made to function as an electronic viewfinder, the display driver 112 reduces, in accordance with the number of dots of the display 111, the resolution of digital signals A/D-converted by the A/D converter 104 once and accumulated in the memory 116. After that, the display driver 112 converts the digital signals into liquid crystal display signals, and successively transfers them to the display 111.

The memory 116 is also used as an area (buffer) that temporarily stores data to be recorded in the memory card, such as JPEG still image data generated by the JPEG codec 108 and MPEG moving image data generated by the MPEG codec 109. The data stored in the buffer of the memory 116 is read by a memory card controller 113 and written in the memory card (recording medium). Write/read of the data in/from the buffer is controlled by a control unit 118. In addition, the memory 116 provides a work memory space for a pixel count conversion unit 110 that generates, from a shot image, a thumbnail image to be used for index-display at the time of reproduction. The pixel count conversion unit 110 converts the pixel count of the JPEG still image data held in the memory 116 or that of a frame image of the MPEG moving image data, thereby generating a thumbnail image. Furthermore, as described above, the memory 116 provides a space as a video memory for display on the display 111.

The memory card A 115 and the memory card B 121 (to be also collectively referred to as memory cards hereinafter) can be attached/detached to/from the digital camera 100 via a card slot/detection SW A 114 and a card slot/detection SW B 120, respectively. These memory cards can be implemented by, for example, NAND flash memories®. The control unit 118 can manage, as a file, data recorded in the memory card in accordance with a file system such as a FAT (File Allocation Table) file system.

The memory card controller 113 communicates with the memory card A 115 or the memory card B 121 to control them, thereby recording, in the memory card, data from the memory 116. The memory card controller 113 reads the data from the memory card, and transfers it to the memory 116.

The card slot/detection SW A 114 is a slot into which the memory card A 115 is inserted, and includes a detection SW (switch) for detecting the presence/absence of insertion into the slot. The card slot/detection SW B 120 is a slot into which the memory card B 121 is inserted, and includes a detection SW (switch) for detecting the presence/absence of insertion into the slot.

An operation unit 117 is formed by various operation members that accept various operations from the user, and can include a shutter button used to perform a still image shooting operation, a trigger button used to instruct the start and stop of shooting of a moving image, and a mode switch used to switch between the shooting mode and the reproduction mode of the camera.

A ROM 119 is an electrically erasable/recordable nonvolatile memory, and stores constants, programs, and the like for the operation of the control unit 118. The programs indicate programs for executing various sequences to be described later in this embodiment, and implement respective operations of this embodiment (to be described later).

The control unit 118 includes one or more processors (for example, CPUs), and operates in accordance with the operation programs stored in the ROM 119 to control the respective units of the digital camera. The control unit 118 performs display control by controlling the display driver 112 and the like. In this embodiment, using a tuning pattern signal of the same pattern as that stored in the memory card A 115 or the memory card B 121, the control unit 118 determines whether a test pattern (to be described later) has succeeded and performs an operation of determining a latch timing.

Figure 2A:
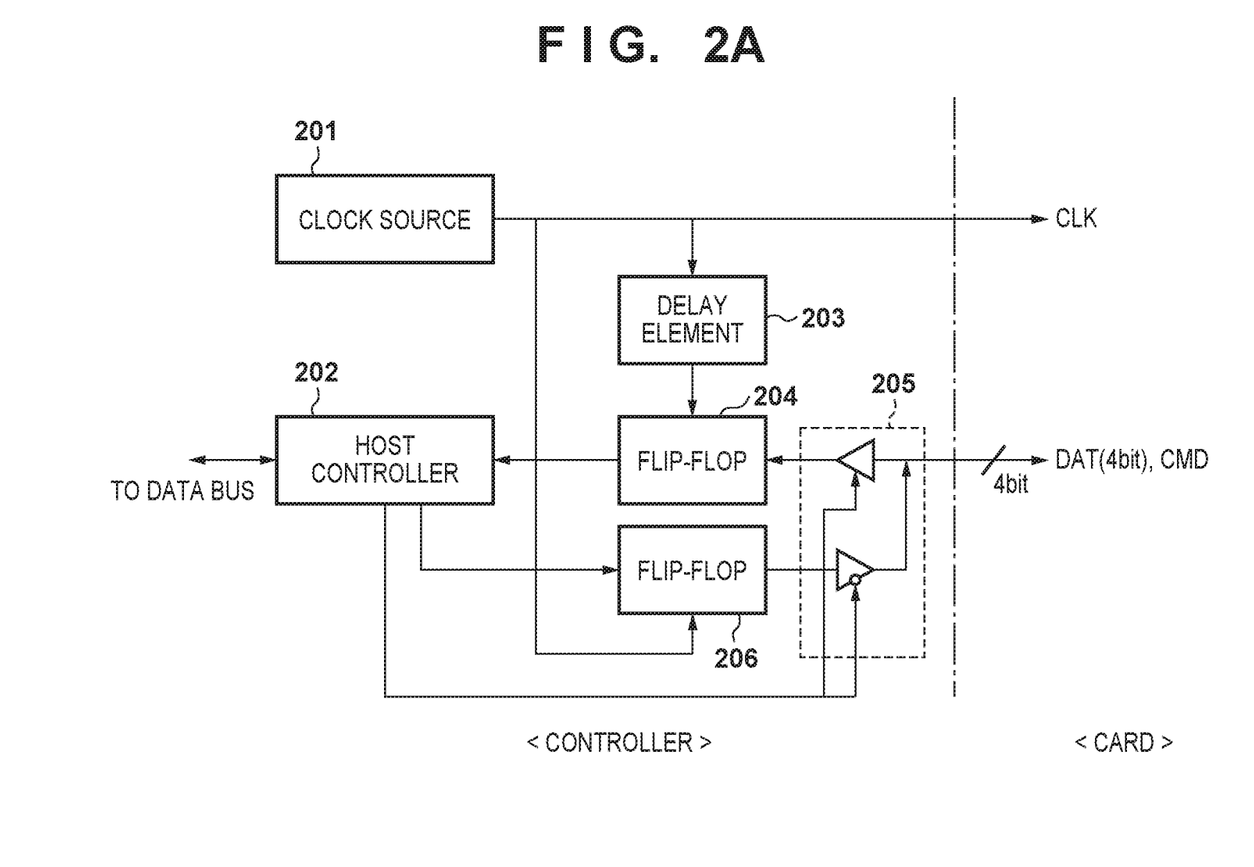
FIG. 2A is a block diagram showing an example of the arrangement of a memory card controller 113 according to the embodiment of the invention.

The arrangement and operation of the memory card controller 113 will be described with reference to FIG. 2A. FIG. 2A is a block diagram showing an example of the arrangement of the memory card controller 113 according to this embodiment. To write and read data in and from the memory card, the memory card controller 113 transmits/receives signals and data via a CLK line, a CMD line, and a DAT line. Processing for the memory card will be described below. This processing can be executed equally for the memory card A 115 and the memory card B 121.

A clock source 201 outputs, via the CLK line, a clock signal (CLK signal) that is formed by a clock pulse and used to control a read/write timing. The clock source 201 gives data write and read timings to the memory card, and also gives data transmission and reception timings to a host controller 202 (to be described later). The host controller 202 outputs a command signal associated with read/write processing via the CMD line, and receives a response signal to the command from the memory card via the CMD line. The host controller 202 controls to transmit/receive, via the DAT line, data to be written in the memory card or data read from the memory card. In this embodiment, the data from the host controller 202 is written in a writing unit of a predetermined size. A data size corresponding to one writing unit is a write size β (to be described later). The host controller 202 transmits the moving image data or still image data read from the buffer of the memory 116 or another data to the memory card via the DAT line in synchronism with the clock signal from the clock source 201.

In reading/writing data, as described above, the clock pulse is different from the timing of transmitting/receiving data. Therefore, a delay element 203 delays the phase of the clock signal under the control of the control unit 118 when reading the data from the memory card, and generates a timing signal for receiving the data output from the memory card. A flip-flop 204 then latches the data output from the memory card in response to the timing signal output from the delay element 203. That is, the timing signal defines the timing of latching the data.

A flip-flop 206 latches write data from the host controller 202, and transmits it to the memory card via the DAT line in accordance with the timing of the clock signal from the clock source 201. Note that a signal branch unit 205 switches between the CMD line and the DAT line in accordance with input/output of a command and transmission/reception of data. The response and data from the memory card, that have been output from the flip-flop 204, are sent to the host controller 202.

The operation of the tuning processing (adjustment processing) according to this embodiment will be described next. The memory card controller 113 issues a test data transmission command to the memory card. In response to this, the memory card transmits a 64-byte data sequence (test data) of a predetermined pattern in synchronism with the clock signal sent from the clock source 201. The memory card controller 113 receives the test data in response to a timing signal obtained by delaying, by the delay element, the clock signal generated by the clock source 201. It is possible to change the phase of the timing signal by changing the value of the number of delay steps set by the delay element 203. The control unit 118 determines whether the test data has been successfully received while changing the relationship between the phase of the clock signal and that of the timing signal, that is, while changing the latch timing by the flip-flop 204.

More specifically, the control unit 118 sends a test data transmission command to the memory card in a state in which the amount of the delay element 203 is set to the first delay amount. In response to a timing signal with the first delay amount, the flip-flop 204 receives the test data transmitted by the memory card. The control unit 118 compares the received test data with test data held in advance, and determines whether the test data has been successfully received. After the end of the processing of receiving the test data in response to the timing signal with the first delay amount, the control unit 118 sets the delay amount of the delay element 203 to the second delay amount, and retransmits the test data transmission command to the memory card A 115. Then, the control unit 118 determines whether the test data received in response to the timing signal with the second delay amount has been successfully received.

As described above, while changing the delay amount by the delay element 203, the control unit 118 repeats the processing of determining whether the test data has been successfully received with each delay amount. Note that the delay amount that is changed at a time is about a fraction of several tens of one cycle of the clock signal. Upon completion of reception of the test data in response to all the timing signals with the delay amounts, the control unit 118 selects the delay amount with which the test data has been successfully received most stably, and sets it as the delay amount of the timing signal in the delay element 203.

Figure 2B:
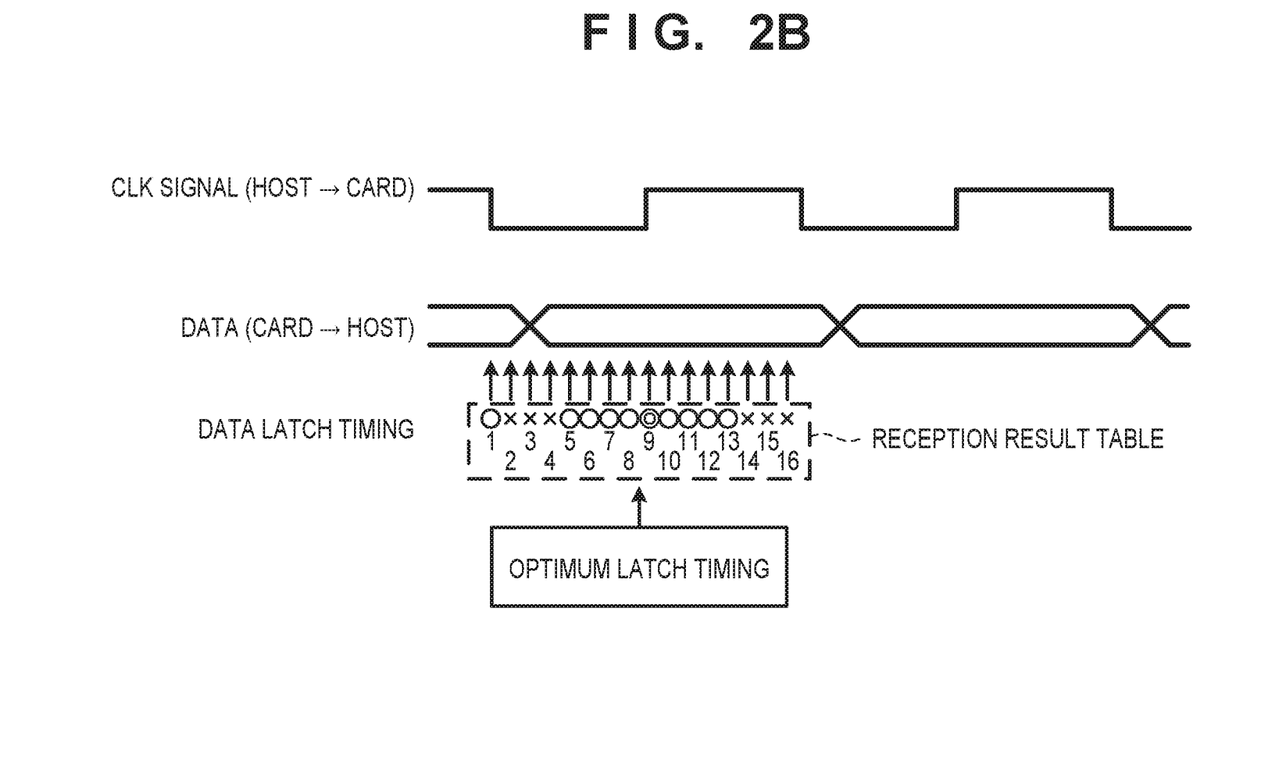
FIG. 2B is a timing chart for explaining a latch timing of a memory card according to the embodiment of the invention.

FIG. 2B is a timing chart for explaining a latch timing of the memory card. It is possible to set a plurality of delay amounts for one cycle of the clock signal and ensure a plurality of latch timings. In this example, latch timings of 16 steps are ensured.

The series of processes described above will be referred to as tuning processing of the latch timing (that is, processing of adjusting the delay amount of the timing signal) hereinafter. As described above, while the tuning processing is performed, it is impossible to write and read image data in and from the memory card.

Figure 3:
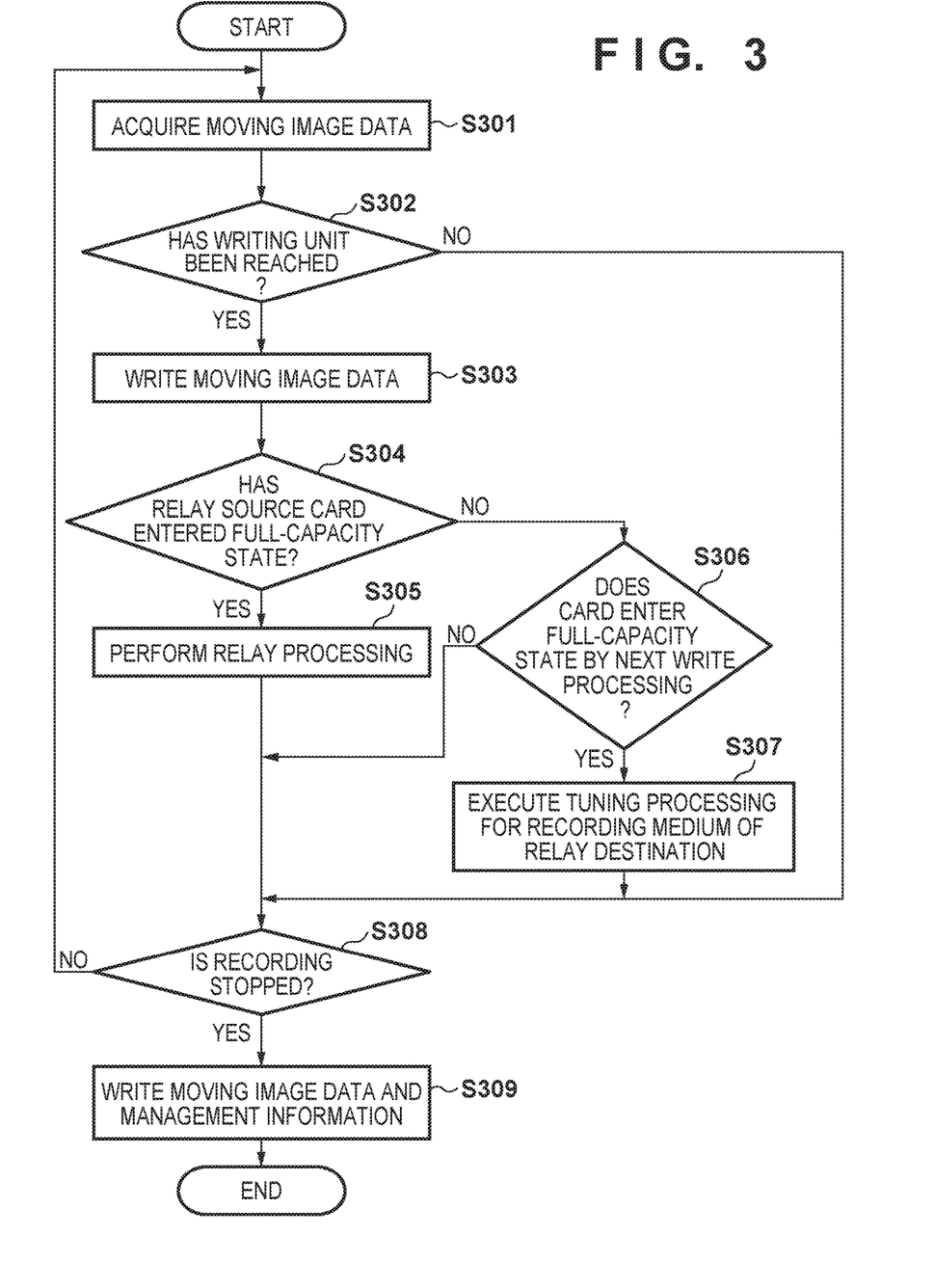
FIG. 3 is a flowchart illustrating an example of the operation of a recording/reproduction apparatus according to the first embodiment of the invention.

The control operation of the tuning processing by the digital camera 100 during data recording will be described next with reference to FIG. 3. FIG. 3 is a flowchart illustrating an example of processing executed by the digital camera 100 according to this embodiment. A moving image shooting mode of recording MPEG moving image data coded by MPEG coding including inter-frame prediction coding will be exemplified with reference to FIG. 3. However, this embodiment is not limited to the inter-frame prediction coding or MPEG coding, and is applicable to case in which any moving data is recorded. Furthermore, this embodiment is not limited to the moving image data, and is applicable to a case in which continuously generated data are recorded. For example, the generated data may be audio data or other data.

At the time of recording as well, it is necessary to receive, from the memory card, a response to a write command output to the memory card. To do this, even during recording, it is desirable to receive data at an appropriate latch timing. On the other hand, an image generated by moving image shooting generally has a large data size. Thus, if write of data is hindered by the tuning processing, the free capacity of the internal buffer may decrease, causing a recording stop due to a buffer overflow. Therefore, it is especially effective to reduce the frequency at which tuning is performed during recording along with a moving image shooting operation.

The digital camera 100 as the recording/reproduction apparatus according to this embodiment has a relay recording function. The relay recording function indicates a function of, if the free capacity of one memory card as a recording destination during recording of moving image data runs out, continuing recording of the moving image data by switching the recording destination to the other memory card. The user operates the operation unit 117 in a recording standby state to select one of the memory card A 115 and the memory card B 121 as a recording destination. A case in which the user selects the memory card A 115 as a recording destination, and start recording of the moving image data will be described below. If the free capacity of the memory card A 115 runs out after the start of recording of the moving image data and before a recording stop instruction by the user, relay recording of continuing recording of the moving image data by automatically switching the recording destination to the memory card B 121 is performed.

In this embodiment, when switching the recording destination to the memory card B 121, the tuning processing is performed for the memory card B 121. Since the memory card B 121 as a recording medium of a switching destination is inserted in advance, the tuning processing may be performed before the start of recording in the memory card A 115. Since, however, a change in delay amount caused by heat mainly generated during recording is a main factor for a phase shift between the timing signals, it is desirable to perform the tuning processing as much as possible immediately before switching the recording destination. To do this, in this embodiment, control is executed to perform the tuning processing at a timing immediately before data write processing performed immediately before switching the recording medium as a recording destination.

If the user operates the operation unit 117 to instruct to start recording, the processing shown in the flowchart of FIG. 3 starts. First, in step S301, the control unit 118 controls the MPEG codec 109 to code the moving image data, and accumulates the coded moving image data in the buffer of the memory 116 allocated for moving image data. In this embodiment, the data write speed in the memory card A 115 is higher than the data rate of the coded moving image data. Thus, when recording the moving image data, the coded moving image data is temporarily stored in the buffer memory space of the memory 116. Then, if the data amount of unrecorded moving image data stored in the buffer memory reaches a predetermined data amount, the moving image data is read from the buffer memory and recorded in the memory card A 115.

Since the recording speed of the memory card A 115 is higher than the data rate of the moving image data, the data amount of the moving image data stored in the buffer memory decreases while the moving image data is written in the memory card A 115. During this period as well, the moving image data is continuously accumulated in the buffer memory. Upon completion of write of the moving image data of a predetermined size in the memory card A 115, the write is stopped. In this way, in this embodiment, during a period from the start of recording of the moving image until recording is stopped, the moving image data is intermittently recorded in the memory card A 115.

In step S302, the control unit 118 determines whether a total size $\alpha$ (megabytes (MB)) of the moving image data accumulated in the buffer of the memory 116 has reached the write size $\beta$ (MB). As described above, the write size $\beta$ is the size of data written in the memory card A 115 by performing write processing once in intermittent recording of the moving image data. If the total size $\alpha$ of the moving image data accumulated in the buffer has reached the write size $\beta$, the process advances to step S303.

In step S303, the control unit 118 controls the memory card controller 113 to issue a write command to the memory card A 115, and writes, in the memory card A 115, the moving image data of the write size $\beta$ accumulated in the buffer of the memory 116. After the end of the write of the data, the control unit 118 determines in step S304 whether the memory card A 115 has entered a full-capacity state and the free capacity has run out. In this embodiment, it is possible to set, as a threshold for determining whether the memory card has entered the full-capacity state, a value smaller, by a predetermined amount, than a capacity usable to record the moving image data in the recordable capacity of the memory card A 115.

If it is determined in step S304 that the memory card A 115 has entered the full-capacity state, the control unit 118 performs relay processing in step S305. The control unit 118 controls the memory card controller 113 to issue a write command to the memory card A 115 and the memory card B 121. The control unit 118 writes, in the memory card A 115, the management information and the moving image data accumulated in the buffer of the memory 116 to close a moving image file being recorded in the memory card A 115 as a recording medium of a relay source. Furthermore, the control unit 118 writes, in the memory card B 121, the management information and the moving image data accumulated in the buffer of the memory 116 to newly open a moving image file in the memory card B 121 as a recording medium of a relay destination. If the relay processing is performed in this way, the transmission destination of subsequent moving image data is switched from the memory card A 115 to the memory card B 121. After that, the moving image data is recorded in the memory card B 121.

Note that if, after switching the data transmission destination to the memory card B 121, during recording of the moving image data in the memory card B 121, it is determined in step S304 that the memory card B 121 has entered in the full-capacity state and the free capacity has run out, recording of the moving image is stopped without performing the relay processing.

If it is not determined in step S304 that the memory card A 115 has entered the full-capacity state, the process advances to step S306. In step S306, the control unit 118 determines whether the remaining amount of the memory card A 115 is in a state in which the free capacity runs out and the memory card A 115 enters the full-capacity state by the next write processing. For example, the control unit 118 can make determination in accordance with whether the total of the use amount (recorded data amount) of the memory card A 115 and the write size β reaches the threshold for determining the full-capacity state. Alternatively, the control unit 118 may determine whether the remaining amount of the memory card A 115 is smaller than a predetermined remaining amount. The predetermined remaining amount can be determined based on the write size β, and is set to a value larger than the write size β, that is obtained by giving a margin to the write size β. If the control unit 118 determines that the memory card A 115 is in a state in which it enters the full-capacity state by the next write processing, the process advances to step S307. If the control unit 118 determines that the memory card A 115 is not in the state, the process advances to step S308.

In step S307, the control unit 118 controls the memory card controller 113 to perform the tuning processing of the recording medium of the relay destination. In this case, the tuning processing of the memory card B 121 is performed. As described above, in this embodiment, if it is predicted that the relay processing is performed after the next moving image data write processing, the tuning processing of the recording medium of the relay destination is performed before the moving image data write processing and the relay processing.

In step S308, the control unit 118 determines whether to stop moving image recording. If, for example, the capacity of the memory card B 121 becomes full after the relay processing or a recording stop instruction is issued via the operation unit 117, it is determined to stop moving image recording. If moving image recording is not stopped, the process returns to step S301, and the control unit 118 continues moving image recording. On the other hand, if moving image recording is stopped, the control unit 118 writes, in step S309, in the memory card A 115 or the memory card B 121, the management information and the moving image data accumulated in the buffer of the memory 116 to close the moving image file being recorded, and then stops moving image recording.

Figure 4:
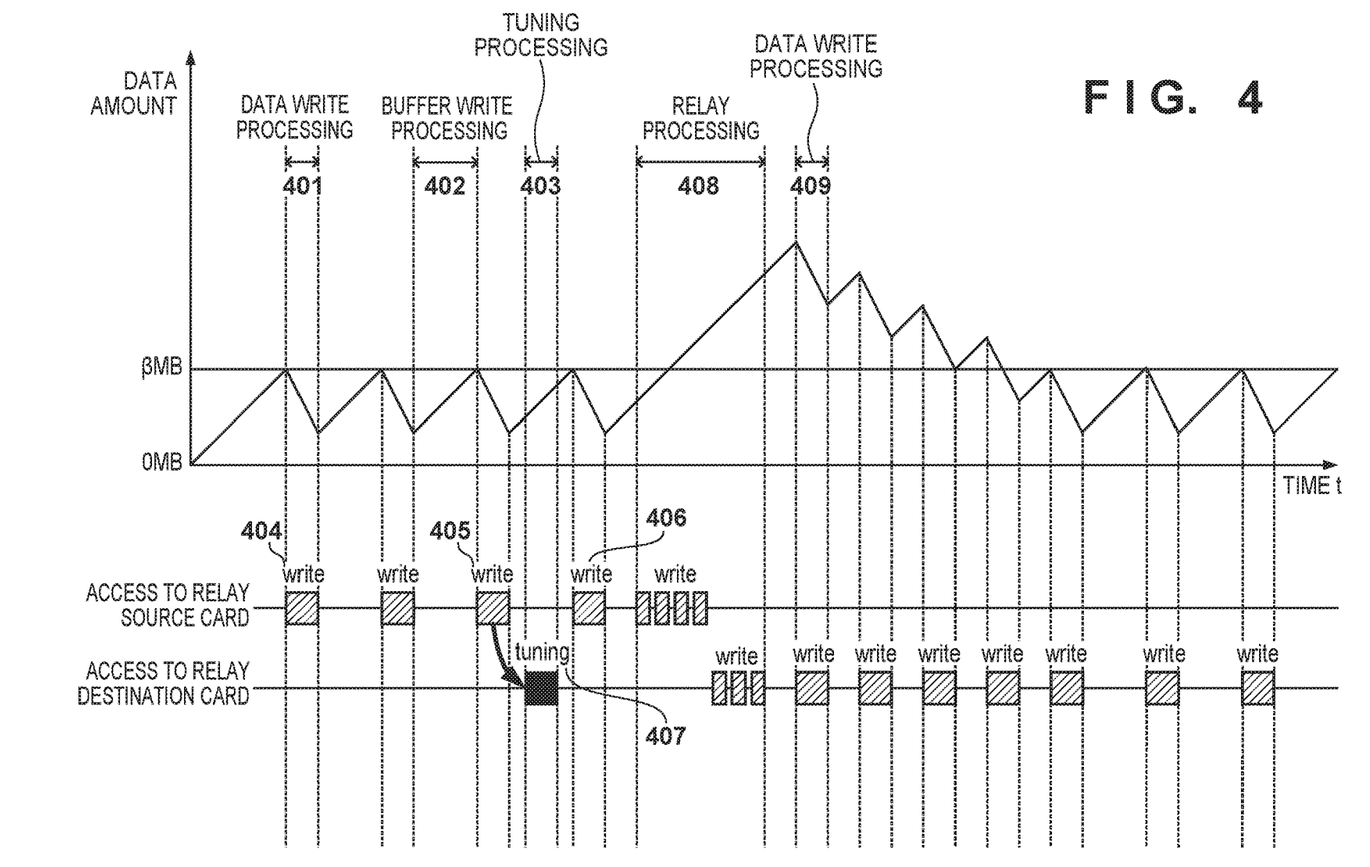
FIG. 4 is a sequence chart showing an example of the operation of the recording/reproduction apparatus according to the first embodiment of the invention.

FIG. 4 is a sequence chart showing, in time series, the series of operations in the flowchart of FIG. 3 using transition of the accumulation state of the buffer at the time of moving image recording and the times of the write processing and tuning processing. The ordinate represents the amount of the moving image data accumulated in the buffer, and the abscissa represents time t. Note that the buffer is allocated in the memory 116.

Reference numeral 401 denotes a time during which the moving image data accumulated in the buffer is written in the memory card A 115; 402, a time during which the moving image data is accumulated in the buffer and a time interval for executing data write; and 403, a time during which the memory card B 121 is tuned. In this embodiment, the execution period of the tuning processing is shorter than the execution interval of data write. Therefore, since the tuning processing ends within a time between data write operations, the tuning processing generates no delay of data write. Reference numeral 408 denotes a time during which the moving image data and management information along with relaying are written in the memory card A 115 and the memory card B 121; and 409, a time during which the moving image data accumulated in the buffer is written in the memory card B 121.

At a moving image data write timing 404, the control unit 118 can determine that the memory card A 115 does not enter the full-capacity state by the next write processing. At a moving image data write timing 405, the control unit 118 can determine that the memory card A 115 enters the full-capacity state by next write processing denoted by reference numeral 406. Therefore, during a period 407 after the write timing 405 and before the next write timing 406, the tuning processing is performed for the memory card B 121. If it is predicted that the relay processing is performed after the next moving image data write processing, the tuning processing is performed for the memory card B 121 before the relay processing. The control unit 118 determines that the memory card A 115 has entered the full-capacity state after the moving image data write timing 406, and performs the relay processing in the period 408.

In the embodiment of the invention in which the tuning processing is performed when the usable remaining amount of the memory card A 115 reaches the predetermined remaining amount, the embodiment when the remaining amount corresponds to the write size β of one write operation has particularly been explained above. In this example, tuning is performed at a timing determined as that immediately before the memory card A 115 enters the full-capacity state, based on the total of the use amount of the memory card A 115 and the write size β MB.

The above embodiment has described a case in which every time the write processing is performed, it is determined whether to perform the tuning processing. The embodiment of the invention is not limited to this. For example, the number of times of execution of data write before the memory card A 115 enters the full-capacity state may be calculated in advance based on the use amount of the memory card A 115 and the write size β at a recording start, the number of times of execution may be decremented every time the write processing is performed, and tuning may be performed at the timing when the remaining number of times of execution becomes one.

As described above, according to the first embodiment, based on the usable remaining amount of the recording medium in which data write is currently performed, the digital camera 100 can perform tuning immediately before the start of the relay processing and immediately before the write processing used as a trigger to perform the relay processing. This can suppress a write error and retry caused by a lack of tuning at the timing when there is no margin in the buffer during the relay processing, thereby suppressing occurrence of a recording stop caused by a buffer overflow.

Second Embodiment

In the above-described first embodiment, to perform relay recording of, if the memory card of the recording destination enters the full-capacity state, continuing recording by switching the recording destination, moving image data write processing immediately before the start of the relay processing for relay recording is determined, and the tuning processing is performed for the memory card of the relay destination. The first embodiment assumes that the time taken for the tuning processing is short so the tuning processing does not influence the execution interval of data write. Therefore, to determine a timing of performing the tuning processing, it is only necessary to consider the write size β corresponding to one write processing with respect to the usable remaining amount of the recording medium in which data write is currently performed.

However, it is also assumed that the tuning processing takes long time (longer than the execution interval of data write) depending on the type of recording medium. In this case, if moving image data write processing immediately before the relay processing is determined to execute tuning, tuning may not be completed before the relay processing and, in addition, the buffer may overflow. To solve this problem, as the second embodiment, an embodiment in which tuning processing of a recording medium of a relay destination is executed at a timing according to the time taken for the tuning processing will be described. In this embodiment, the remaining amount of a recording medium as a write target, that is required when executing the tuning processing, is determined in accordance with the length of the time taken to execute the tuning processing.

The basic arrangements of a digital camera 100 and a memory card controller 113 according to this embodiment are the same as those (FIGS. 1 and 2A) described in the first embodiment. The difference from the first embodiment will mainly be described below.

The tuning processing according to this embodiment will be described below with reference to FIGS. 5A, 5B, and 6. Initial processing executed when a memory card is inserted will be explained first with reference to FIG. 5A. If the user inserts a memory card A 115 or a memory card B 121 into the digital camera 100, when a card slot/detection SW A 114 or a card slot/detection SW B 120 detects the insertion of the memory card into a slot, the initial processing shown in the flowchart of FIG. 5A starts. If the memory card A 115 is inserted, a control unit 118 performs, in step S501, an initial sequence of the memory card A 115 via the memory card controller 113. In step S502, the control unit 118 controls the memory card controller 113 to perform tuning processing of the memory card A 115. At this time, the control unit 118 measures the time taken for the tuning processing. In step S503, the control unit 118 stores, in a memory 116, the tuning time obtained by the measurement processing in step S502.

The memory card A 115 has been exemplified here. However, even if the memory card B 121 is inserted, the same processing is performed, and the control unit 118 stores the tuning time of the memory card A 115 and that of the memory card B 121 in the memory 116.

Moving image recording processing according to this embodiment will be described next. In this embodiment as well, a case in which recording starts in a state in which the user selects the memory card A 115 as a recording destination will be explained. If the user operates an operation unit 117 to instruct to start recording, the moving image recording processing shown in the flowchart of FIG. 5B starts.

Figure 5A:
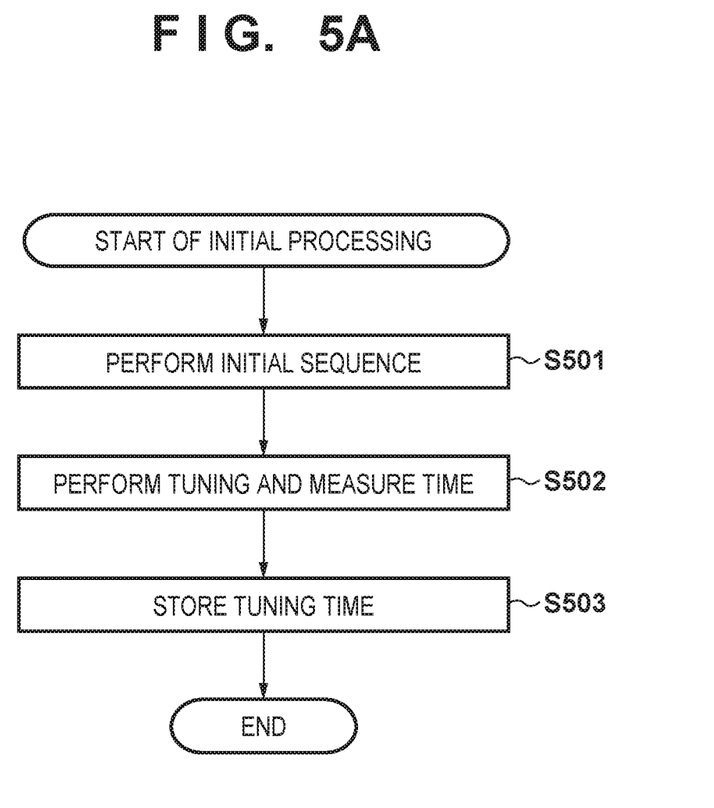
FIG. 5A is a flowchart illustrating an example of the initial processing of a recording/reproduction apparatus according to the second embodiment of the invention.

In step S511, the control unit 118 calculates, based on the tuning time stored in the memory 116 in step S503 of FIG. 5A and a bit rate of a recording setting, a size α' (MB) of moving image data stored in the buffer memory of the memory 116 during the tuning time. For example, when Tt represents the tuning time and Rw represents the write speed of the moving image data in the buffer, α'=Rw·Tt is obtained. At this time, if the tuning time Tt falls within the time interval (a period 402 in FIG. 4) of write in the memory card, a problem of a buffer overflow is prevented from arising by write processing with a write size β, as in the first embodiment. To the contrary, in the case assumed in this embodiment, the tuning time exceeds the interval, it is impossible to perform write processing in the recording medium, and thus the accumulation amount of the buffer increases to exceed the write size β. Therefore, after completion of tuning, it is necessary to cancel the increase as soon as possible. Note that the write speed in the memory card is fixed, and cannot thus be changed. In this embodiment, the write cycle is changed before and after tuning. For example, while the write interval before tuning is $T_{t1}$, the write interval after tuning is $T_{t2}$ ($T_{t1} > T_{t2}$). Note that there may be a plurality of kinds of $T_{t2}$.

When Tc represents a time from the moving image data write processing immediately before the tuning processing until, after the tuning processing, data (α') excessively accumulated in the buffer by tuning is consumed by writing the data in the memory card and the state is then returned to that before the tuning processing, an amount D of data written in the buffer during this time is given by D=Rw·Tc. The data of the size α' is written in the memory buffer during the tuning processing, and the remaining amount D−α' of data is written during a write time after tuning or during the execution interval of data write. In this embodiment, D−α' is represented by β'. In step S511, in addition to α', is calculated. However, only the data amount D may be calculated. Note that the processing in step S511 may be executed in advance following step S503.

Note that the data amount D can be considered as an amount of data written in the memory card from the buffer after the tuning processing in order to return the state to that before the tuning processing. In this embodiment, since write in the memory card is executed in a unit of a write size β, D=nβ (n is a natural number) can be obtained where n represents a predetermined number of times of data write executed after the tuning processing. By executing data write the predetermined number of times, the tuning processing can return the state of the buffer to that before the tuning processing, thereby entering a state in which relay recording is executable. In the processing in step S511, the predetermined number n of times may be calculated.

The reason why it is necessary to consume, after the tuning processing, the amount of data excessively accumulated in the buffer by tuning is to suppress a buffer overflow. In the relay processing performed after the tuning processing, write in the memory card is restricted again, and the data accumulation amount of the buffer memory increases. To cope with this, it is necessary to cancel, before the relay processing, the excessive amount in the buffer, that has been generated by the tuning processing.

Processes in steps S301 to S305 are the same as in the first embodiment and a description thereof will be omitted. If it is not determined in step S304 that the use amount of the memory card A 115 has entered the full-capacity state, the control unit 118 determines in step S512 whether the remaining amount of the memory card A 115 is in a state in which the free capacity runs out and the memory card A 115 enters the full-capacity state by executing data write processing the predetermined number n of times. For example, the control unit 118 can make determination in accordance with whether the total of the use amount of the memory card A 115 and the data sizes α' and β' (corresponding to the data amount D) during the tuning time reaches a threshold for determining the full-capacity state. The control unit 118 may determine whether the remaining amount of the memory card A 115 has become smaller than a predetermined remaining amount based on the data amount D. At this time, the predetermined remaining amount is set to a value larger than the data amount D, that is obtained by giving a margin to the data amount D. If the control unit 118 determines that the memory card A 115 is in the above-described state, the process advances to step S307; otherwise, the process advances to step S308.

In step S307, the control unit 118 controls the memory card controller 113 to execute the tuning processing for the memory card B 121. Processes in step S308 and the subsequent step are the same as in the first embodiment and a description thereof will be omitted.

Note that similarly to the first embodiment, in this embodiment, for example, the number of times of execution of data write until the memory card A 115 enters the full-capacity state may be calculated in advance based on the use amount of the memory card A 115 and the write size β at the start of recording, the number of times of execution may be decremented every time the write processing is performed, and tuning may be performed at the timing when the remaining number of times of execution becomes n.

As described above, in this embodiment, the timing of executing the tuning processing for a recording medium of a relay destination is determined in accordance with whether a recording medium of a relay source has a remaining amount corresponding to the tuning time.

Figure 5B:
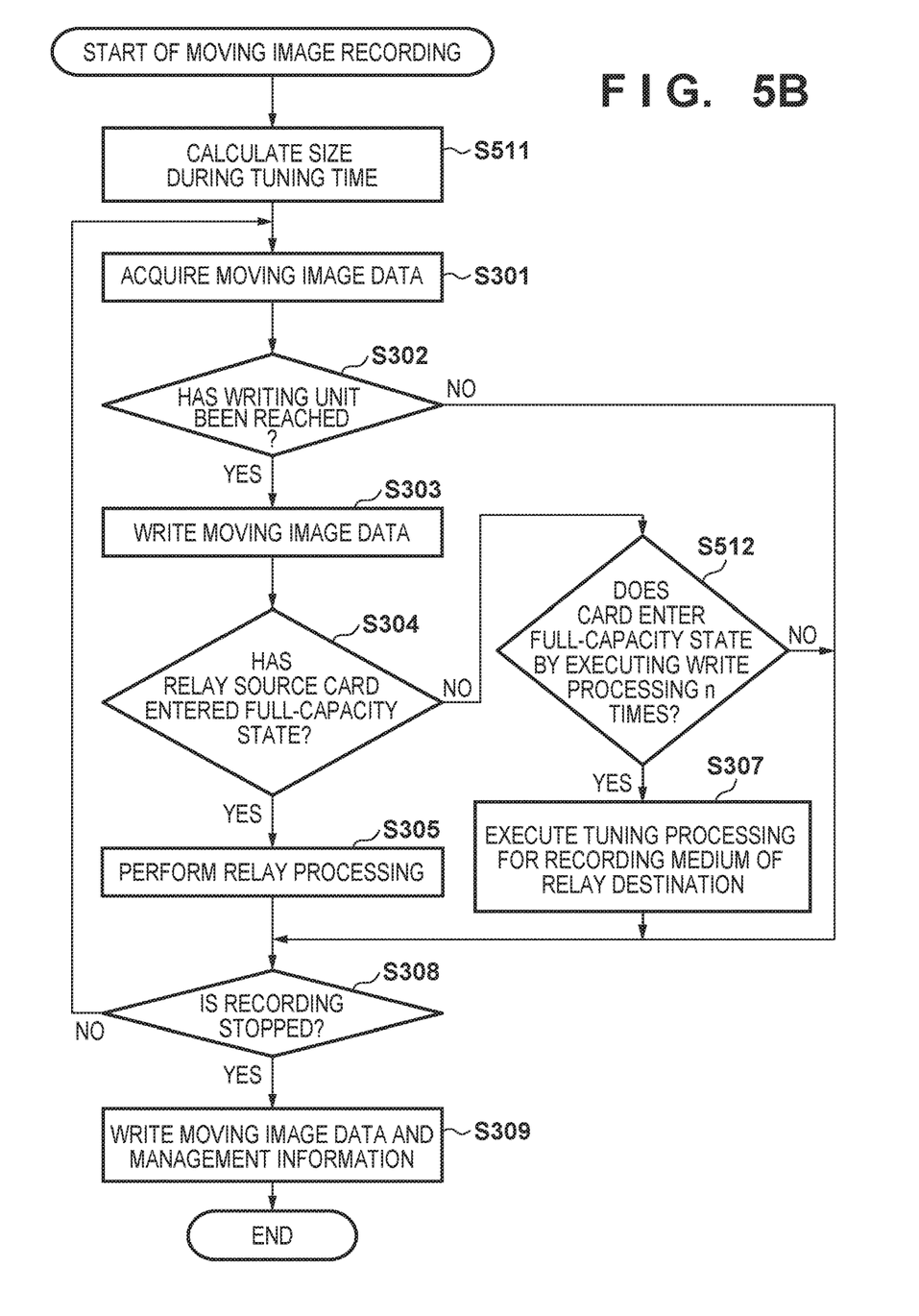
FIG. 5B is a flowchart illustrating an example of the moving image recording processing of the recording/reproduction apparatus according to the second embodiment of the invention.
Figure 6:
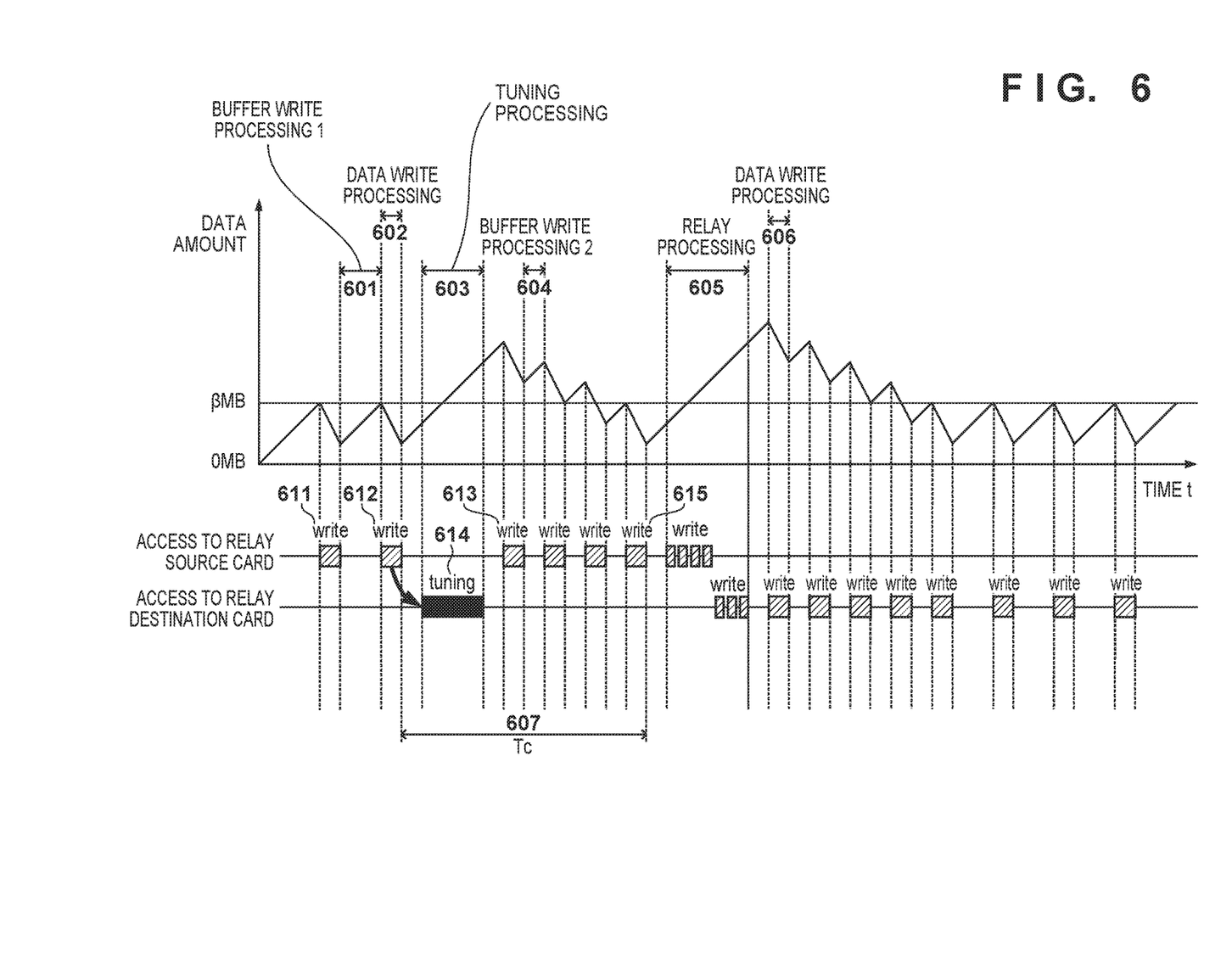
FIG. 6 is a sequence chart showing an example of the operation of the recording/reproduction apparatus according to the second embodiment of the invention.

FIG. 6 is a sequence chart showing, in time series, the series of operations in the flowcharts of FIGS. 5A and 5B using transition of the accumulation state of the buffer at the time of moving image recording and the times of the write processing and tuning processing. The ordinate represents the amount of the moving image data accumulated in the buffer, and the abscissa represents time t. Note that the buffer is allocated in the memory 116.

Reference numeral 601 denotes a time during which the moving image data to be written in the memory card A 115 is accumulated in the buffer. The length of the time 601 corresponds to $T_{i1}$ described above. During this time, the moving image data accumulated in the buffer is not written in the memory card A 115, and thus the amount of the moving image data accumulated in the buffer increases. Reference numeral 602 denotes a time during which the moving image data accumulated in the buffer is written in the memory card A 115; and 603, a time during which the memory card B 121 is tuned.

Reference numeral 604 denotes a time during which the moving image data to be written in the memory card A 115 is accumulated in the buffer and a time interval when data write is executed a plurality of times after the tuning processing. The length of the time 604 corresponds to $T_{i2}$ described above, and is shorter than that of the time 601. During this time, the moving image data accumulated in the buffer is not written in the memory card A 115 but the write time becomes shorter, and thus the increase in amount of the moving image data accumulated in the buffer is smaller than that for the time 601. Note that after the end of the tuning processing, the memory card controller 113 substantially, continuously issues a write command until the amount of the data accumulated in the buffer becomes smaller than β. Therefore, $T_{i2}$ corresponds to a period for receiving a response transmitted from the card when the memory card completes write of data by one write command and a period for issuing a next write command. That is, as soon as a write completion response is received from the memory card, the memory card controller 113 starts processing for issuing a write command. Reference numeral 605 denotes a time during which the moving image data and management information along with relaying are written in the memory card A 115 and the memory card B 121; and 606, a time during which the moving image data accumulated in the buffer is written in the memory card B 121.

Reference numeral 607 denotes a time from when moving image data write processing 612 immediately before tuning ends until moving image data write processing 613 immediately before the relay processing ends. The time 607 corresponds to the above-described time Tc, and is a time that should be ensured to prevent a buffer overflow caused by the tuning processing when the relay processing is performed after executing the tuning processing. Note that in FIG. 6, the write processing is executed four times after the tuning processing. Therefore, it is necessary to execute the write processing four times to write data of 4β in the memory card A 115 after performing the tuning processing. This means that the memory card A 115 need only have at least a remaining amount of 4β at the time of executing the tuning processing. Therefore, the timing of executing the tuning processing is desirably determined immediately before the remaining amount of the memory card A 115 becomes smaller than 4β (or a predetermined remaining amount set based on 4β) by executing the next data write processing.

Immediately after moving image data write 611, the control unit 118 determines that the remaining amount of the memory card A 115 does not become smaller than the predetermined remaining amount by the next data write processing 612, the memory card A 115 still has a margin, and thus the timing of executing the tuning processing has not come yet. Immediately after the moving image data write processing 612, the control unit 118 determines that the remaining amount of the memory card A 115 becomes smaller than the predetermined remaining amount by the next data write processing 613, and tunes the memory card B 121 at a timing 614. The control unit 118 executes moving image data write processing four times after executing the tuning processing, determines, at a moving image data write timing 615, that the use amount of the memory card A 115 has entered the full-capacity state, and performs relay processing.

As described above, by tuning the memory card B 121 at the timing 614 immediately after the moving image data write processing 612, the state of the buffer can be returned to that before the tuning processing, and the relay processing performed after the moving image data write processing 613 can be executed in a state in which the buffer has a margin.

Note that the second embodiment has been explained as an embodiment different from the first embodiment. However, the first embodiment has described a case in which the predetermined number n of times of data write executed after the tuning processing is one and the second embodiment has described a case in which n is two or more. Thus, it can be immediately understood that the first and second embodiments share the technical concept.

As described above, according to the second embodiment, the digital camera 100 can perform the tuning processing as close as possible to the relay processing while preventing a buffer overflow after the tuning processing by determining a tuning execution timing in consideration of the tuning time. This can suppress a write error and retry caused by a lack of tuning at the timing when there is no margin in the buffer during the relay processing, thereby suppressing occurrence of a recording stop caused by a buffer overflow.

Other Embodiments

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-068745, filed on Mar. 30, 2017, which is hereby incorporated by reference herein in its entirety.

What is claimed is:

1. A recording apparatus comprising:
at least one processor;
a memory storing a program which, when executed by the at least one processor, causes the recording apparatus to function as:
an output unit configured to output a clock signal to each of a plurality of recording media;
a communication unit configured to transmit a write command and write data to each of the plurality of recording media to write the data in each recording medium and to receive a response to the write command, that is transmitted from each of the plurality of recording media, in accordance with a timing signal obtained by delaying the clock signal; and
a control unit configured to control the communication unit to execute relay recording of, if data is transmitted and written in a first recording medium of the plurality of recording media, continuing the write of the data by switching a transmission destination of the data from the first recording medium to a second recording medium of the plurality of recording media,
wherein the control unit controls the communication unit in the relay recording so as to execute adjustment processing of adjusting a delay amount of the timing signal with respect to the second recording medium before switching the transmission destination of the data from the first recording medium to the second recording medium, and to write, in the first recording medium, data corresponding to a period of the adjustment processing before switching the transmission destination of the data from the first recording medium to the second recording medium.

2. The apparatus according to claim 1, wherein the control unit controls to execute the adjustment processing when a remaining amount of the first recording medium reaches a predetermined remaining amount associated with the period of the adjustment processing.

3. The apparatus according to claim 2, wherein
the data is written in the first recording medium in a writing unit of a predetermined size, and
the data corresponding to the period of the adjustment processing is written in the first recording medium by executing data write a predetermined number of times in the writing unit.

4. The apparatus according to claim 3, wherein the predetermined number of times is changed in accordance with a length of the period of the adjustment processing.

5. The apparatus according to claim 3, wherein the predetermined number of times is one or two or more.

6. The apparatus according to claim 1, wherein by writing data corresponding to the period of the adjustment processing, the first recording medium enters a full-capacity state.

7. The apparatus according to claim 1, wherein based on a total, of a use amount of the first recording medium and a data amount of the data corresponding to the period of the adjustment processing, the control unit determines a timing of executing the adjustment processing.

8. The apparatus according to claim 1, wherein
the data is written in the first recording medium in a writing unit of a predetermined size, and
the control unit sets a time interval for data write of the data corresponding to the period of the adjustment processing to be shorter than a time interval for data write executed before executing the adjustment processing.

9. The apparatus according to claim 1, wherein the program further causes the recording apparatus to function as:
a generation unit configured to generate data to be recorded in each recording medium.

10. The apparatus according to claim 1, wherein the program further causes the recording apparatus to function as:
a buffer memory configured to store data to be written in the plurality of recording media, and
the control unit controls the communication unit so as to write, before switching the transmission destination of the data from the first recording medium to the second recording medium, in the first recording medium, the data stored in the buffer memory while executing the adjustment processing.

11. The apparatus according to claim 1, wherein the control unit controls the communication unit so as to execute the adjustment processing at a predetermined timing based on a remaining amount of the first recording medium and the period of the adjustment processing.

12. The apparatus according to claim 11, wherein the program causes the recording apparatus to function as:
a buffer memory configured to store data to be written in the plurality of recording media, and
the control unit controls the communication unit so as to execute the adjustment processing at a timing when the remaining amount of the first recording medium is a capacity capable of recording the data stored in the buffer memory during the period corresponding to the adjustment processing.

13. A recording method comprising:
outputting a clock signal to each of a plurality of recording media;

transmitting a write command and write data to each of the plurality of recording media to write the data in each recording medium;

receiving, a response to the write command, that is transmitted from each of the plurality of recording media, in accordance with a timing signal obtained by delaying the clock signal;

executing relay recording of, if data is transmitted and written in a first recording medium of the plurality of recording media, continuing the write of the data by switching a transmission destination of the data from the first recording medium to a second recording medium of the plurality of recording media; and performing a control, in the relay recording, to execute adjustment processing of adjusting a delay amount of the timing signal with respect to the second recording medium before switching the transmission destination of the data from the first recording medium to the second recording medium and to write, in the first recording medium, data corresponding to a period of the adjustment processing before switching the transmission destination of the data from the first recording medium to the second recording medium.

14. A non-transitory computer-readable storage medium storing a program that, when executed by a processor of a recording apparatus, causes the recording apparatus to function as:

an output unit configured to output a clock signal to each of a plurality of recording media;

a communication unit configured to transmit a write command and write data to each of the plurality of recording media to write the data in each recording medium and to receive a response to the write command, that is transmitted from each of the plurality of recording media, in accordance with a timing signal obtained by delaying the clock signal; and a control unit configured to control the communication unit to execute relay recording of, if data is transmitted and written in a first recording medium of the plurality of recording media, continuing the write of the data by switching a transmission destination of the data from the first recording medium to a second recording medium of the plurality of recording media, wherein the control unit controls the communication unit in the relay recording so as to execute adjustment processing of adjusting a delay amount of the timing signal with respect to the second recording medium before switching the transmission destination of the data from the first recording medium to the second recording medium, and to write, in the first recording medium, data corresponding to a period of the adjustment processing before switching the transmission destination of the data from the first recording medium to the second recording medium.

* * * * *